US010710628B2

United States Patent
Asao et al.

(10) Patent No.: US 10,710,628 B2
(45) Date of Patent: Jul. 14, 2020

(54) INTEGRATED ELECTRIC POWER STEERING APPARATUS AND MANUFACTURING METHOD THEREFOR

(71) Applicant: Mitsubishi Electric Corporation, Tokyo (JP)

(72) Inventors: Yoshihito Asao, Tokyo (JP); Akihiko Mori, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 224 days.

(21) Appl. No.: 15/123,098

(22) PCT Filed: Jun. 27, 2014

(86) PCT No.: PCT/JP2014/067172
§ 371 (c)(1),
(2) Date: Sep. 1, 2016

(87) PCT Pub. No.: WO2015/198476
PCT Pub. Date: Dec. 30, 2015

(65) Prior Publication Data
US 2017/0066470 A1 Mar. 9, 2017

(51) Int. Cl.
*H02K 5/15* (2006.01)
*B62D 5/04* (2006.01)
(Continued)

(52) U.S. Cl.
CPC ........... *B62D 5/046* (2013.01); *B62D 5/0403* (2013.01); *B62D 5/0406* (2013.01); *H02K 5/18* (2013.01);
(Continued)

(58) Field of Classification Search
CPC ........ H02K 11/02; H02K 7/116; H02K 11/00; H02K 11/33; H02K 15/00; H02K 5/18; H02K 9/22
See application file for complete search history.

(56) References Cited

U.S. PATENT DOCUMENTS 3,721,843 A   3/1973   Spisak et al.
5,691,892 A   11/1997  Meyer et al.
(Continued)

FOREIGN PATENT DOCUMENTS

DE    102008049369 A1    4/2010
GB    2 015 252 A         9/1979
(Continued)

OTHER PUBLICATIONS

International Search Report for PCT/JP2014/067172 dated Sep. 16, 2014.
(Continued)

*Primary Examiner* — Alfonso Perez Borroto
*Assistant Examiner* — Leda T Pham
(74) *Attorney, Agent, or Firm* — Sughrue Mion, PLLC; Richard C. Turner

(57) ABSTRACT

The motor unit includes a motor case containing a stator and a rotor fixed to an output shaft; the control unit includes a unit case containing constituent members of the control unit that controls the motor unit; the motor unit and the control unit are fixed to each other in such a way that an axle-direction end, at the unit case side, of the motor case is made to abut on an axle-direction end, at the motor unit side, of the unit case and then the both ends are bonded to each other.

15 Claims, 5 Drawing Sheets

(51) Int. Cl.
  *H02K 5/22* (2006.01)
  *H02K 11/33* (2016.01)
  *H02K 5/18* (2006.01)
  H02K 15/14 (2006.01)
  H02K 5/10 (2006.01)
  H02K 9/22 (2006.01)
  H02K 15/00 (2006.01)

(52) U.S. Cl.
  CPC ............ *H02K 5/225* (2013.01); *H02K 11/33* (2016.01); *H02K 5/10* (2013.01); *H02K 9/22* (2013.01); *H02K 15/0062* (2013.01); *H02K 15/14* (2013.01)

(56) References Cited

U.S. PATENT DOCUMENTS

| | | | |
|---|---|---|---|
| 6,501,661 | B1 | 12/2002 | Moore et al. |
| 9,450,476 | B2 * | 9/2016 | Ito .................... H02K 11/38 |
| 2003/0202328 | A1 | 10/2003 | Deeney et al. |
| 2004/0145261 | A1 * | 7/2004 | Ganter .................. H02K 3/50 310/91 |
| 2004/0232873 | A1 | 11/2004 | Heizmann et al. |
| 2010/0314192 | A1 | 12/2010 | Nagase et al. |
| 2011/0031851 | A1 * | 2/2011 | Uryu ................... H02K 11/024 310/68 B |
| 2011/0048838 | A1 | 3/2011 | Asakura et al. |
| 2011/0048839 | A1 | 3/2011 | Asakura et al. |
| 2012/0161590 | A1 * | 6/2012 | Yamasaki ............ H02K 5/225 310/68 B |
| 2012/0229005 | A1 * | 9/2012 | Tominaga ............ B62D 5/0406 310/68 B |
| 2013/0057122 | A1 * | 3/2013 | Huck .................... H02K 5/225 310/68 R |
| 2014/0008142 | A1 | 1/2014 | Yoshikawa et al. |
| 2014/0091683 | A1 * | 4/2014 | Ito ...................... B62D 5/0406 310/68 R |
| 2014/0246958 | A1 * | 9/2014 | Taniguchi ............ H02K 21/14 310/68 B |
| 2015/0171709 | A1 | 6/2015 | Ito et al. |
| 2015/0333600 | A1 | 11/2015 | Nakano et al. |
| 2016/0006324 | A1 | 1/2016 | Akutsu et al. |

FOREIGN PATENT DOCUMENTS

| | | |
|---|---|---|
| JP | 2004-278569 A | 10/2004 |
| JP | 2007-104851 A | 4/2007 |
| JP | 2009-112133 A | 5/2009 |
| JP | 2009-280018 A | 12/2009 |
| JP | 2011-041355 A | 2/2011 |
| JP | 2011-121379 A | 6/2011 |
| JP | 2011-148407 A | 8/2011 |
| JP | 2012-197029 A | 10/2012 |
| JP | 2013-106376 A | 5/2013 |
| JP | 2014-058212 A | 4/2014 |
| JP | 2014-075866 A | 4/2014 |
| WO | 03/001650 A1 | 1/2003 |
| WO | 2014/033833 A1 | 3/2014 |
| WO | 2014/054098 A1 | 4/2014 |
| WO | 2014/054155 A1 | 4/2014 |

OTHER PUBLICATIONS

Communication dated Jan. 18, 2018 from the European Patent Office in counterpart application No. 14895630.3.
Communication dated Feb. 12, 2018, from State Intellectual Property Office of the P.R.C. in counterpart application No. 201480080174.1.
Communication dated Mar. 14, 2017, issued from the Japan Patent Office in counterpart Japanese Application No. 2016-528960.
Communication dated May 25, 2018 from the European Patent Office in counterpart application No. 14895630.3.
Communication dated Dec. 5, 2018, from European Patent Office in counterpart application No. 14895630.3.
Communication dated Jun. 25, 2019 from the Intellectual Property India in counterpart IN Application No. 201647041927.
Communication dated Jul. 11, 2019 issued by the European Patent Office in counterpart application No. 14 895 630.3.

* cited by examiner

INTEGRATED ELECTRIC POWER STEERING APPARATUS AND MANUFACTURING METHOD THEREFOR

CROSS REFERENCE TO RELATED APPLICATIONS

This application is a National Stage of International Application No. PCT/JP2014/067172 filed Jun. 27, 2014, the contents of all of which are incorporated herein by reference in their entirety.

TECHNICAL FIELD

The present invention relates to a vehicle electric power steering apparatus and a manufacturing method therefor; in particular, the present invention relates to an integrated electric power steering apparatus and a manufacturing method therefor in which a motor unit and a control unit are arranged in parallel with and integrated with each other in a direction in which the axis line of the output shaft of the motor unit extends.

BACKGROUND ART

To date, with regard to an integrated electric power steering apparatus having a structure in which a motor unit and a control unit are integrated in such a way as to be arranged in parallel with each other in a direction in which the axis line of the output shaft of the motor unit extends, there has been disclosed an integrated electric power steering apparatus having a structure in which a control unit is disposed at the side, of a motor unit, that is opposite to the side thereof where the output shaft of the motor unit extends, i.e., at the anti-output side of the motor unit. Such a conventional integrated electric power steering apparatus is configured with at least three units including a flange portion for combining a motor unit with a speed reducing mechanism unit, a motor case unit containing the motor unit main body, and a control unit (e.g., refer to Patent Document 1).

PRIOR ART REFERENCE

Patent Document

[Patent Document 1] Japanese Patent Application Laid-Open No. 2011-41355

DISCLOSURE OF THE INVENTION

Problems to be Solved by the Invention

Because as described above, the conventional integrated electric power steering apparatus disclosed in Patent Document 1 has a structure including three units, i.e., the flange portion, the motor case unit, and the control unit, the number of units are large; thus, there has been a problem that the number of components increases and that it is required to combine the units and hence the assembly man-hours also increases. Moreover, screwing is implemented for combining the units; however, because a flange for screwing is required at each of combining portions, the overall size of the apparatus becomes large, which poses an adverse effect in the layout of a vehicle. Furthermore, there has been a problem that in the case where it is required to make the electric power steering apparatus waterproof, waterproofing measures have to be applied to each of abutting portions where respective units abut on each other.

The present invention has been implemented in order to solve the foregoing problems in a conventional integrated electric power steering apparatus; the objective thereof is to provide an integrated electric power steering apparatus in which in comparison with a conventional integrated electric power steering apparatus, the number of units to be combined is small and to provide a manufacturing method therefor.

Means for Solving the Problems

An integrated electric power steering apparatus according to the present invention includes a motor unit and a control unit that controls the motor unit; the control unit is disposed at the anti-output side of an output shaft of the motor unit and in parallel with the motor unit in a direction in which the axis line of the output shaft extends, and is integrally fixed to the motor unit. The integrated electric power steering apparatus is characterized in that the motor unit includes a motor case containing a stator and a rotor fixed to the output shaft, in that the control unit includes a unit case containing constituent members of the control unit, in that the motor unit and the control unit are fixed to each other in such a way that an axle-direction end, at the unit case side, of the motor case is made to abut on an axle-direction end, at the motor unit side, of the unit case and then the both ends are bonded to each other, and in that the motor case has a mounting unit that is joined to another structure at the anti-output side of the output shaft.

In the integrated electric power steering apparatus according to the present invention, it is desirable that each of the motor case and the unit case is formed in the shape of a cylinder, and the outer diameters of the respective cylinders are the same as or approximately the same as each other.

A manufacturing method for an integrated electric power steering apparatus, according to the present invention, is a manufacturing method for an integrated electric power steering apparatus that includes a motor unit and a control unit, for controlling the motor unit, that is disposed at the anti-output side of an output shaft of the motor unit and in parallel with the motor unit in a direction in which the axis line of the output shaft extends and is integrally fixed to the motor unit; the integrated electric power steering apparatus is characterized in that the motor unit includes a motor case containing a stator and a rotor fixed to the output shaft, in that the control unit includes a unit case containing constituent members of the control unit, and in that the motor unit and the control unit are fixed to each other in such a way that an axle-direction end, at the unit case side, of the motor case is made to abut on an axle-direction end, at the motor unit side, of the unit case and then the both ends are bonded to each other; the manufacturing method is characterized in that electrical connection between the motor unit and the control unit is performed before the motor unit and the control unit are bonded to each other.

A manufacturing method for an integrated electric power steering apparatus, according to the present invention, is a manufacturing method for an integrated electric power steering apparatus that includes a motor unit and a control unit, for controlling the motor unit, that is disposed at the anti-output side of an output shaft of the motor unit and in parallel with the motor unit in a direction in which the axis line of the output shaft extends and is integrally fixed to the motor unit; the integrated electric power steering apparatus is characterized in that the motor unit includes a motor case containing a stator and a rotor fixed to the output shaft, in that the control unit includes a unit case containing constituent members of the control unit, and in that the motor unit and the control unit are fixed to each other in such a way that an axle-direction end, at the unit case side, of the motor case is made to abut on an axle-direction end, at the motor unit side, of the unit case and then the both ends are bonded to each other; the manufacturing method is characterized in that electrical connection between the motor unit and the control unit is performed in a process where the motor unit and the control unit are bonded to each other.

Advantage of the Invention

In an integrated electric power steering apparatus according to the present invention, the motor unit includes a motor case containing a stator and a rotor fixed to an output shaft; the control unit includes a unit case containing constituent members of the control unit; the motor unit and the control unit are fixed to each other in such a way that an axle-direction end, at the unit case side, of the motor case is made to abut on an axle-direction end, at the motor unit side, of the unit case and then the both ends are bonded to each other. As a result, there can be obtained an integrated electric power steering apparatus that has a small number of portions to be combined with one another, in comparison with a conventional apparatus. Moreover, when the respective outer diameters of the motor case and the unit case are equal or approximately equal to each other, the diameters of thereof become the maximum outer diameter of the overall integrated electric power steering apparatus; thus, the whole apparatus can be downsized and the shape thereof can be simplified.

According to a manufacturing method for an integrated electric power steering apparatus, according to the present invention, electrical connection between the motor unit and the control unit in the integrated electric power steering apparatus configured in such a manner as described above is performed before the motor unit and the control unit are bonded to each other; therefore, even when an integrated electric power steering apparatus has a connection structure in which electrical connection between the motor case and the unit case cannot be performed at the same time when they are bonded to each other, the electrical connection between the motor case and the unit case is securely performed so that the integrated electric power steering apparatus can be manufactured.

Furthermore, according to a manufacturing method for an integrated electric power steering apparatus, according to the present invention, electrical connection between the motor unit and the control unit in the integrated electric power steering apparatus configured in such a manner as described above is performed in a process where the motor unit and the control unit are bonded to each other; therefore, the integrated electric power steering apparatus can be manufactured in an extremely simple manner and in an extremely small number of processes.

BEST MODE FOR CARRYING OUT THE INVENTION

Embodiment 1

Figure 1:
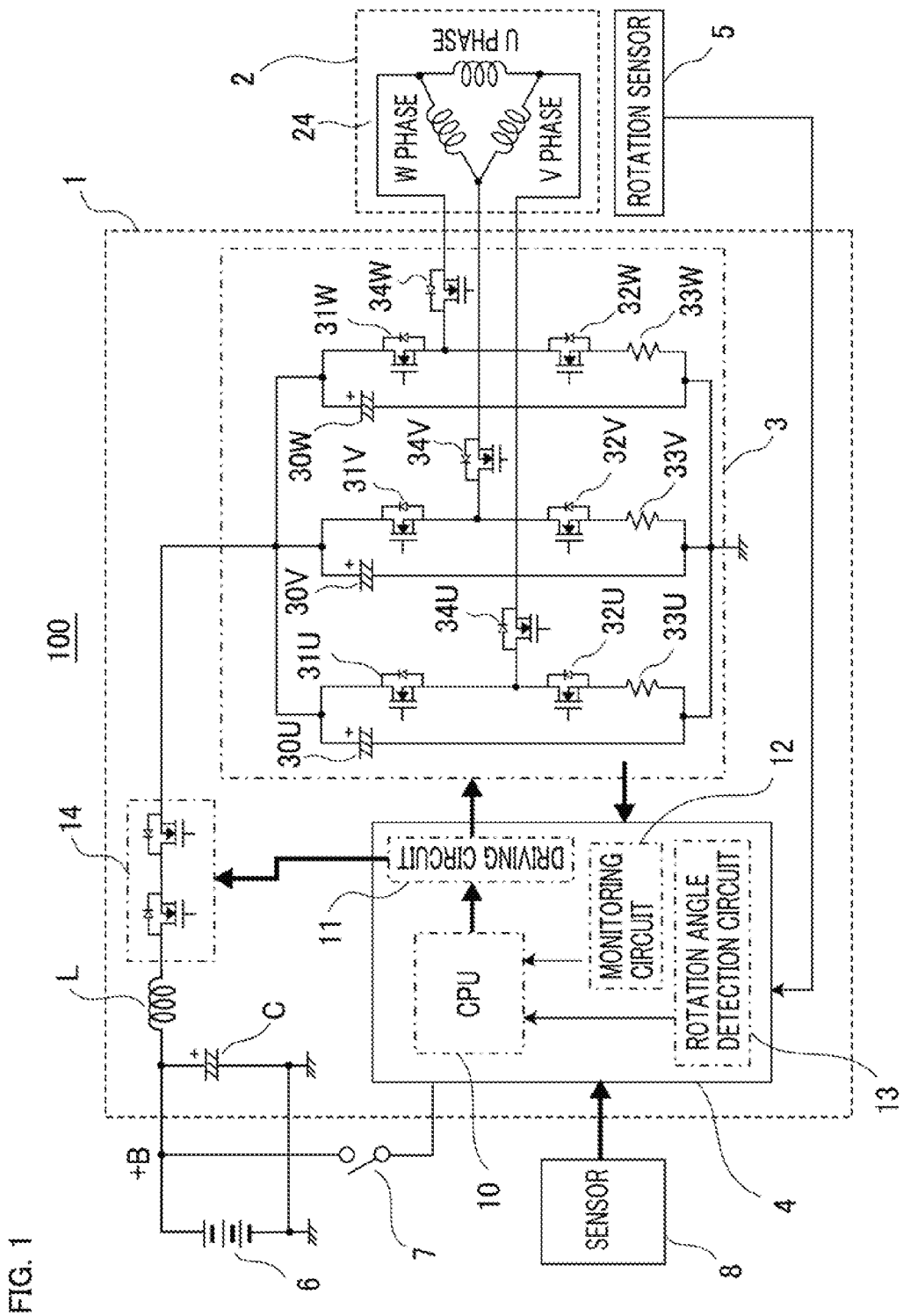
FIG. 1 is a circuit diagram of an integrated electric power steering apparatus according to Embodiment 1 of the present invention.

Hereinafter, an integrated electric power steering apparatus according to Embodiment 1 of the present invention will be explained based on the drawings. FIG. 1 is a circuit diagram of the whole integrated electric power steering apparatus according to Embodiment 1 of the present invention. In FIG. 1, an integrated electric power steering apparatus 100 according to Embodiment 1 of the present invention is configured with a control unit 1 and a motor unit 2. In Embodiment 1, the motor unit 2 is formed of a three-phase brushless motor. It may be allowed that the motor unit 2 is a brush motor or a multi-phase-winding motor having windings of three or more phases.

As described later, a rotation sensor 5 disposed in the vicinity of the output shaft of the motor unit 2 generates an output corresponding to the rotation angle of the rotor of the motor unit 2. The control unit 1 has a control apparatus configured mainly with a control board 4 on which a CPU 10 is mounted and a so-called inverter circuit 3 that supplies an electric current to an armature winding 24 of the motor unit 2. The output of a battery 6 mounted in a vehicle, the output of an ignition switch 7, and the respective outputs of various kinds of sensors 8 including a vehicle speed sensor, a torque sensor that detects steering torque produced and exerted on a handwheel by a driver, and the like are inputted to the integrated electric power steering apparatus 100.

The control board 4 provided in the control unit 1 includes the CPU 10 that calculates a control amount for controlling electric power to be supplied to the motor unit 2, based on information obtained from the outputs of the various kinds of sensors 8, an initial-stage driving circuit 11 that drives an inverter circuit 3, based on the output of the CPU 10, a monitoring circuit 12 that detects the voltages or the electric currents at respective points in the inverter circuit 3, and a rotation angle detection circuit 13 that detects the rotation angle of the rotor of the motor unit 2, based on the output of the rotation sensor 5.

The control unit 1 is further provided with a capacitor C, for eliminating noise, that is connected between the positive-polarity terminal and the negative-polarity terminal of the battery 6, a coil L for eliminating noise, one terminal of which is connected with the positive-polarity terminal of the battery 6, and a power-source switching device 14 that is connected between the positive-polarity terminal of the battery 6 and the inverter circuit 3 and that has a relay function of opening and closing the power supply line leading to the inverter circuit 3. The power-source switching device 14 is configured with two switching devices that are connected in series with each other; each of the two switching devices is configured with, for example, an FET (Field-Effect Transistor) and a parasitic diode connected in parallel with the FET.

The parasitic diode of one switching device, out of the two switching devices included in the foregoing power-source switching device 14, is connected forward in the direction in which an electric current is supplied to the inverter circuit 3, and the parasitic diode of the other switching device is connected backward in the foregoing current supply direction. Accordingly, when the inverter circuit 3 or the motor unit 2 fails, the power-source switching device 14 is turned off, so that supply of electric power to the inverter circuit can forcibly be cut off. Even in the case where the positive-polarity terminal and the negative-polarity terminal of the battery 6 are connected reversely, the foregoing parasitic diodes of the two switching devices can cut off the power supply line leading to the inverter circuit 3 so as to cut off the electric current to the inverter circuit 3; thus, each of the parasitic diodes has a function of performing a so-called protection task at a time when the battery is reversely connected.

The inverter circuit 3 is formed of a three-phase bridge circuit and has three respective pairs of upper and lower arms for U phase, V phase, and W phase, as represented in FIG. 1. A power switching device 31U formed of a semiconductor device is connected with the U-phase upper arm; a power switching device 32U formed of a semiconductor device is connected with the U-phase lower arm. A power switching device 31V formed of a semiconductor device is connected with the V-phase upper arm; a power switching device 32V formed of a semiconductor device is connected with the V-phase lower arm. A power switching device 31W formed of a semiconductor device is connected with the W-phase upper arm; a power switching device 32W formed of a semiconductor device is connected with the W-phase lower arm.

The power switching device 31U in the U-phase upper arm and the power switching device 32U in the U-phase lower arm are molded, as an after-mentioned single U-phase power module 3a, in a single and the same insulating resin. The power switching device 31V in the V-phase upper arm and the power switching device 32V in the V-phase lower arm are molded, as an after-mentioned single V-phase power module 3b, in a single and the same insulating resin. The power switching device 31W in the W-phase upper arm and the power switching device 32W in the W-phase lower arm are molded, as an after-mentioned single W-phase power module (unillustrated), in a single and the same insulating resin. Accordingly, there are provide three power modules that correspond to the respective phases. It may be allowed that each of the six power switching devices 31U, 32U, 31V, 32V, 31W, and 32W is formed as a single power module.

The connection point between the U-phase upper and lower arms is connected with the armature winding 24 of U phase in the motor unit 2, by way of a relaying switching device 34U having a relay function. The connection point between the V-phase upper and lower arms is connected with the armature winding 24 of V phase in the motor unit 2, by way of a relaying switching device 34V having a relay function. Similarly, the connection point between the W-phase upper and lower arms is connected with the armature winding 24 of W phase in the motor unit 2, by way of a relaying switching device 34W having a relay function.

Each of the power switching devices 31U, 32U, 31V, 32V, 31W, and 32W of the respective phases in the inverter circuit 3 is PWM (Pulse Width Modulation)-driven based on commands from the CPU 10. The foregoing PWM-driving causes noise in the inverter circuit 3; thus, in order to suppress the noise, noise-suppression capacitors 30U, 30V, and 30W are connected in parallel with the upper and lower arms, connected in series with each other, of the respective phases. Each of shunt resistors 33U, 33V, and 33W are connected between the part, of the vehicle, that has the ground level and each of the lower arm power switching devices 32U, 32V, and 32W, respectively.

The operation of the integrated electric power steering apparatus, according to Embodiment 1 of the present invention, configured in such a manner as described above is as follows. Firstly, steering torque exerted on the handwheel by a driver is detected by a torque sensor; the amount of the detected steering torque and the outputs of the various kinds of sensors 8 are inputted to the CPU 10. Based on the input information from the various kinds of sensors 8, the CPU 10 calculates an electric current to be supplied to the armature winding 24 of the motor unit 2. Based on the result of the calculation by the CPU 10, the driving circuit 11 drives each of the power switching devices 31U, 32U, 31V, 32V, 31W, and 32W of the inverter circuit 3 so as to supply an electric current to the armature winding 24 of the motor unit 2.

The value of an electric current supplied to the armature winding 24 is detected by the monitoring circuit 12; feedback control of the current of the inverter circuit 3 is performed in accordance with the difference between a target value calculated by the CPU 10 and the real current value from the monitoring circuit 12. When the inverter circuit 3 or the motor unit 2 fails, the driving circuit 11 turns off the power-source switching device 14, so that supply of electric power to the inverter circuit 3 is forcibly cut off. In addition, by way of the rotation sensor 5 and the rotation angle detection circuit 13, the CPU 10 calculates the rotation position of the rotor of the motor unit 2 and/or the rotation speed thereof and utilizes the result of the calculation for controlling the motor unit 2. Output torque produced on the output shaft of the motor unit 2 is exerted, as assist torque for the driver, from the output side of the output shaft to the steering system of the vehicle through the intermediary of a speed reducing mechanism.

Figure 2:
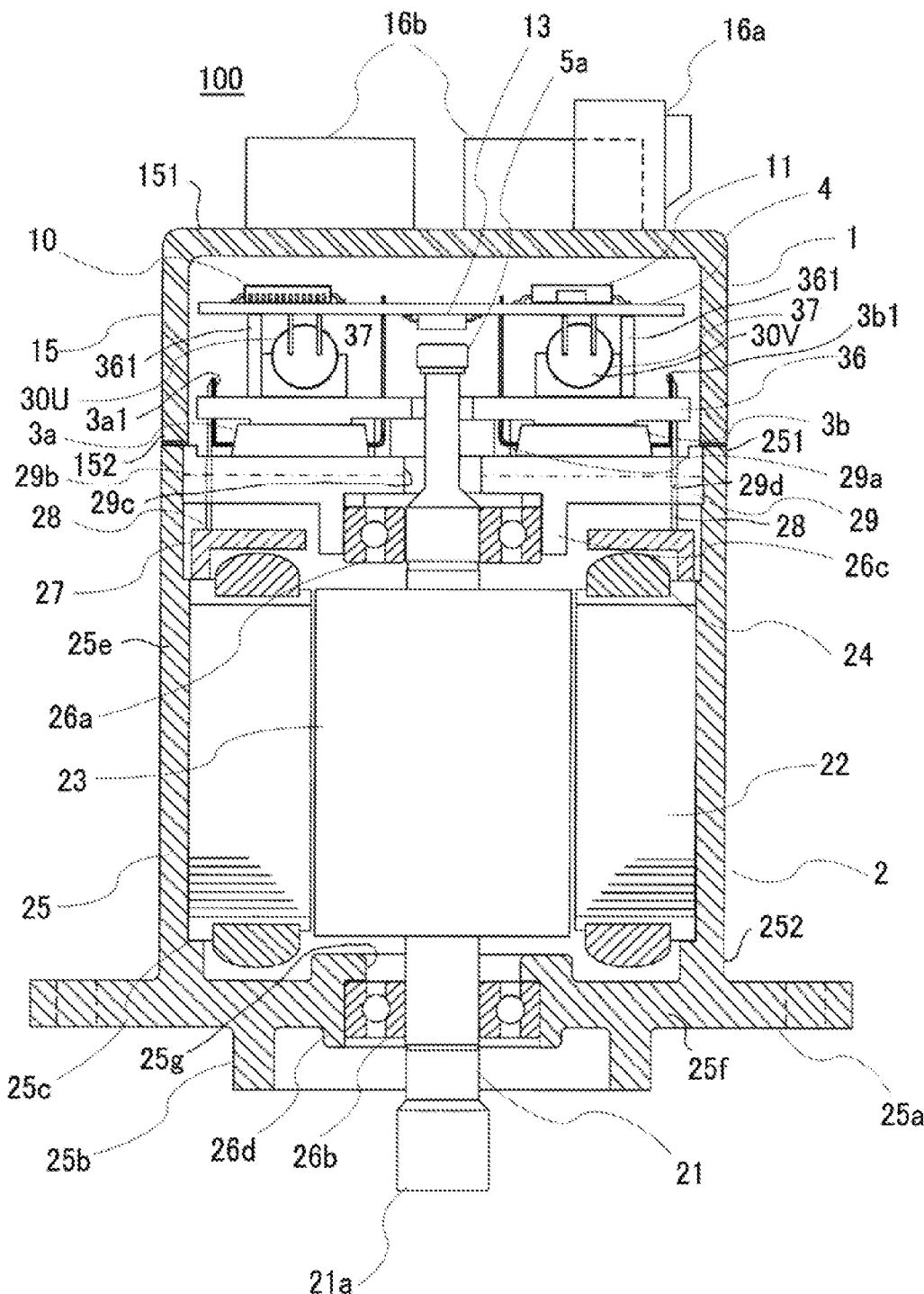
FIG. 2 is a longitudinal cross-sectional view of the integrated electric power steering apparatus according to Embodiment 1 of the present invention.

Next, the configuration of the integrated electric power steering apparatus 100 according to Embodiment 1 of the present invention will be explained. FIG. 2 is a longitudinal cross-sectional view of the integrated electric power steering apparatus according to Embodiment 1 of the present invention. In FIG. 2, the integrated electric power steering apparatus 100 is configured with the motor unit 2 and the control unit 1. In FIG. 2, the motor unit 2 and the control unit 1 are integrally combined with each other in such a way as to be arranged in parallel with each other in a direction in which the axis line of an output shaft 21 of the motor unit 2 extends.

The motor unit 2 is configured with the stator 22 provided with the armature winding 24, a rotor 23 provided with a permanent magnet for forming two or more pairs of magnetic-field poles, a frame 29, and the like that are contained in a metal motor case 25 formed in the shape of a cylinder. The motor case 25 includes a cylinder portion 25e whose one axle-direction end 251 is opened, a wall portion 25f that seals the other axle-direction end 252 of the cylinder portion 25e, a flange portion 25a, as a mounting portion, that extends in the radial direction of the cylinder portion 25e from the wall portion 25f, and a ring-shaped speed reducer connecting portion 25b provided in such a way to protrude in the axle direction from the outer surface of the wall portion 25f. The stator 22 is positioned in the axle direction in such a way that one axle-direction end thereof abuts on a step portion 25c formed on the inner circumferential surface of the motor case 25.

The flange portion 25a is provided in order to mount the integrated electric power steering apparatus 100 on a structure (unillustrated) of the vehicle by use of bolts or the like. The speed reducer connecting portion 25b provided in the wall portion 25f of the motor case 25 is to integrally combine the motor unit 2 with a speed reducer (unillustrated) that decelerates and then outputs the rotation speed of the output shaft 21 of the motor unit 2. When the heat radiation performance and the machinability of forming the inner and outer portions thereof into predetermined contours are taken into consideration, it is desirable that the motor case 25 is formed of, for example, aluminum.

A first bearing holding portion 26d for holding a first bearing 26b that pivotably supports the output side of the output shaft 21 is provided in the wall portion 25f of the motor case 25. An output shaft wall portion through-hole 25g for making the output shaft 21 of the motor unit 2 penetrate the wall portion 25f is provided in the middle portion of the wall portion 25f. The flange portion 25a protruding from the outer circumferential surface of the motor case 25 is disposed at the other axle-direction end 252 of the motor case 25; however, the flange portion 25a may be provided at the middle portion of the motor case 25 or in the vicinity of the one axle-direction end 251 of the motor case 25.

The armature winding 24 is configured with windings of three phases; the U-phase winding, the V-phase winding, and the W-phase winding thereof are connected with one another in a predetermined manner such as a Y-connection or a A-connection, through a ring-shaped connection ring 27. The connection ring 27 is disposed in the vicinity of the axis-direction end of the armature winding 24 at the inner circumferential surface of the one end 251 of the motor case 25. Each of the three respective winding ends 28 (only two pieces are illustrated in FIG. 2) pulled out from the U-phase winding, the V-phase winding, and the W-phase winding of the armature winding 24 farther extends from the connection ring 27 toward the control unit 1 in the axle direction of the motor unit 2.

The discoidal frame 29 is fixed in such a way that the outer circumferential surface thereof abuts the inner circumferential surface of the one axle-direction end 251 of the motor case 25. The frame 29 is made of metal; a second bearing holding portion 26c for holding a second bearing 26a that pivotably holds the anti-output side of the output shaft 21 is provided at the middle portion of the frame 29. An output shaft frame through-hole 29c for making the output shaft 21 of the motor unit 2 penetrate the frame 29 is formed at the middle portion of the frame 29; furthermore, three respective winding-end frame through-holes 29d for making the three winding ends 28 of the armature winding 24 penetrate the frame 29 are provided in the frame 29.

The frame 29 has one surface portion and the other surface portion that are in a top side/bottom side relationship and is disposed in such a way that these surface portions are perpendicular to the axis line of the motor case 25. The peripheral portion of the one surface portion of the frame 29 protrudes in the direction in which the center axis of the motor case 25 extends; the axle-direction end of the peripheral portion is disposed in such a way as to be on the same plane as the axle-direction end of the one end 251 of the motor case 25.

The frame 29 has two or more functions such as a function as a diaphragm that separates the motor unit 2 from the after-mentioned control unit 1, a bearing holding function that holds the second bearing 26a for pivotably holding the output shaft 21 of the motor unit 2, and a winding end holding function that makes the winding end 28 penetrate the frame 29 and holds the winding end 28. Furthermore, the frame 29 has a function as a heat sink for radiating heat generated in the control unit 1. As described above, the frame 29 has a great number of functions; thus, the number of components of the integrated electric power steering apparatus 100 can be reduced.

Next, the control unit 1 will be explained. The control unit 1 is configured in such a way that a unit case 15 contains constituent components such as electronic components of the control unit 1 represented in FIG. 1, described above. The unit case 15 is made of an insulating resin and formed in the shape of a cylinder in such a way that one axle-direction end 151 thereof is sealed and the other axle-direction end 152 is opened. The other end 152 of the unit case 15 is joined to the opened other end 251 of the motor case 25. In other words, the control unit 1 is disposed in parallel with the motor unit 2 in the direction in which the axis line of the output shaft 21 extends, and is integrally joined to the motor unit 2. The unit case 15 is formed in such a way that the outer diameter thereof is the same as or approximately the same as that of the motor case 25.

Through the connectors 16a and 16b arranged on the one axle-direction end 151 of the unit case 15, the output of the battery 6, represented in FIG. 1, that is mounted in the vehicle, the output of the ignition switch 7, and the outputs of various kinds of sensors 8 including a vehicle speed sensor, a torque sensor that detects steering torque exerted on the handwheel by a driver, and the like are inputted to the control unit 1 whose constituent components and the like are contained in the unit case 15.

The control board 4 contained in the unit case 15 includes the CPU 10 that calculates a control amount for controlling electric power to be supplied to the motor unit 2, based on information obtained from the outputs of the various kinds of sensors 8, the initial-stage driving circuit 11 that drives the inverter circuit 3, based on the output of the CPU 10, the monitoring circuit 12 (unillustrated in FIG. 2) that detects the voltages or the electric currents at respective points in the inverter circuit 3, and the rotation angle detection circuit 13 that detects the rotation angle of the rotor 23 of the motor unit 2, based on the output of the rotation sensor 5.

In the unit case 15, a bus bar (unillustrated) extends from the connectors 16a and 16b to the control board 4 and an inverter circuit (unillustrated). The control board 4 has one surface portion and the other surface portion that are in a top side/bottom side relationship and is disposed in such a way that these surface portions are perpendicular to the center axis of the unit case 15. The control board 4 is disposed in such a way as to be most close to the one axle-direction end 151 of the unit case 15 and in such a way that the one surface portion thereof faces the inner surface of the one end 151 of the unit case 15. The CPU 10 and the driving circuit 11 are mounted on the one surface portion of the control board 4.

An intermediate member 36 is disposed in such a way as to face the control board 4 and in such a way as to be spaced a predetermined distance apart from the control board 4 through the intermediary of a columnar member 361. The intermediate member 36 has one surface portion and the other surface portion that are in a top side/bottom side relationship and is disposed in such a way that these surface portions are perpendicular to the center axis of the unit case 15. The intermediate member 36 may be formed of an insulating resin; however, when formed of, for example, aluminum, the intermediate member 36 has a function as a heat sink.

Three noise-suppression capacitors 30U, 30V, and 30W (30W is not illustrated in FIG. 2) mounted on the other surface portion of the control board 4 and respective capacitor holding members 37 for holding the capacitors 30U, 30V, and 30W are arranged in the space between the control board 4 and the intermediate member 36. Each of the capacitor holding members 37 has the foregoing columnar member 361 for supporting the control board 4.

One surface portion of each of the U-phase power module 3a, the V-phase power module 3b, and the W-phase power module (unillustrated) included in the inverter circuit 3 abuts on the other surface portion of the intermediate member 36; the other surface portion thereof abuts on the one surface portion of the frame 29. That is to say, each of the U-phase power module 3a, the V-phase power module 3b, and the W-phase power module is inserted between the frame 29 that functions as a heat sink and the intermediate member 36 that has a function as a heat sink; thus, the heat radiation performance of each of the U-phase power module 3a, the V-phase power module 3b, and the W-phase power module is enhanced.

The respective winding ends 28 of the armature winding 24 are connected, by means of welding, with leg portions 3a1, 3b1, and another leg portion, as the terminals of the U-phase power module 3a, the V-phase power module 3b, and the W-phase power module. The respective output signal lines of the driving circuit 11 extend from the control board 4, penetrate the intermediate member 36 in the vicinity of the output shaft 21, and are connected with the leg portions 3a1, 3b1, and another leg portion (the W-phase power module and the leg portion thereof are not illustrated), as the respective connection terminals of the U-phase power module 3a, the V-phase power module 3b, and the W-phase power module. The respective input signal lines from the driving circuit 11 to the monitoring circuit 12 extend from the inverter circuit including the U-phase power module 3a, the V-phase power module 3b, and the W-phase power module, penetrate the intermediate member 36 in the vicinity of the output shaft 21, and then are connected with the driving circuit 11 on the control board 4.

A rotor 5a of the rotation sensor 5 is mounted on the anti-output shaft-direction end of the output shaft 21. A permanent magnet is mounted on the rotor 5a of the rotation sensor 5. The rotation angle detection circuit 13 mounted on the other surface portion of the control board 4 is disposed in such a way as to face the rotor 5a of the rotation sensor 5; the rotation angle detection circuit 13 generates a signal corresponding to the rotation angle of the rotor 5a and transmits the signal to the CPU 10.

As described above, the control unit 1 includes the unit case 15 and members contained therein; the motor unit 2 includes the motor case 25 and the foregoing members contained therein. The endface of the one axle-direction end 251 of the motor case 25 and the axle-direction endface of the peripheral portion of the one surface portion of the frame 29 are aligned with each other in such a way as to be on a single and the same plane. The control unit 1 and the motor unit 2 are joined to each other in such a way that the endface of the other axle-direction end of the unit case 15 is made to abut on the endface of the motor case 25 and the endface of the frame, which are aligned to be on the same plane, and that the both endfaces are bonded, for example, by use of an adhesive. The waterproof properties of the motor unit 2 and the control unit 1 can be maintained by bonding the motor case 25 and the unit case 15 with a waterproof adhesive.

It is made possible that at the position indicated by a chain line 29b in FIG. 2, the frame 29 is divided into two parts in the axle direction. As a result, each of the motor unit 2 and the control unit 1 can independently be divided. Thus, it is made possible that after independently assembled, the motor unit 2 and the control unit 1 are joined to each other. In this regard, however, it is required that the inner diameter of the hole, at the middle position, of the intermediate member 36 having a function as a heat sink is larger than the outer diameter of the rotor 5a of the rotation sensor 5.

Next, the assembly processes will be explained. At first, in the assembly process for the motor unit 2, the first bearing 26b is mounted in and fixed to the first bearing holding portion 26d of the motor case 25 from the side of the speed reducer connecting portion 25b. Next, the armature winding 24 is wound around the stator 22; connection processing of the armature winding 24 is performed by use of the ring-shaped connection ring 27; then, the stator 22 with the winding end 28 extending linearly in the axle direction is pressed into the motor case 25. In this situation, the stator 22 is inserted into the motor case 25 up to the position where the one axle-direction end thereof abuts on the step portion 25c formed on the inner circumferential surface of the motor case 25.

Next, the second bearing 26a is mounted in and fixed to the second bearing holding portion 26c of the frame 29; the output shaft 21, to which the rotor 23 in which a magnetized magnet is mounted is fixed, is held and then inserted into the control unit 1; the respective center axes of the first bearing 26b and the second bearing 26b are aligned to a single and the same axis line; then, the rotor 23 is inserted into the inner circumference portion of the stator 22. Then, the outer circumferential surface of the frame 29 is made to abut on and is pressed into the inner circumferential surface of the motor case 25. In addition, FIG. 2 represents the case where an attachment 21a is mounted on the axle-direction front-most end of the output side of the output shaft 21; however, because the attachment 21a is not mounted before the foregoing assembly processing, the output shaft 21 can be inserted into the first bearing 26b.

In contrast, in the assembly process for the control unit 1, the U-phase power module 3a, the V-phase power module 3b, and the W-phase power module are mounted, after the assembly of the motor unit 2, in such a way as to abut on the one surface portion of the frame 29, and the respective other surface portions of the intermediate member 36 are made to abut on and are superimposed on the U-phase power module 3a, the V-phase power module 3b, and the W-phase power module. The intermediate member 36, which functions as a heat sink, is positioned by a leg portion 29a and is fixed to the frame 29. At this stage, each of the leg portions 3a1 and 3b1 of the U-phase power module 3a and the V-phase power module 3b and the leg portion of the W-phase power module and the winding end 28 are connected with each other through, for example, welding. Moreover, each of the capacitors 30U, 30V, and 30W (unillustrated in FIG. 2, and the same applies hereinafter) is superimposed on the intermediate member 36, along with the capacitor holding members 37. In this situation, the rotor 5a of the rotation sensor 5 is mounted on the anti-output shaft-direction end of the output shaft 21.

Next, the control board 4 on which electronic components such as the CPU 10, the driving circuit 11, and the rotation angle detection circuit 13 are mounted is superimposed on the capacitors 30U, 30V, and 30W and the capacitor holding members 37; the respective terminals of the capacitors 30U, 30V, and 30W are soldered to the corresponding points in the control board 4, and the control board 4 itself is fixed to the pillar portion of the capacitor holding members 37. Lastly, the unit case 15 is mounted in such a way as to cover the foregoing constituent elements. In addition, although not illustrated, connections between the respective corresponding points in the control board 4 and the connectors 16*a* and 16*b* of the unit case 15 are made in such a way that the respective terminals extending from the control board 4 are prolonged up to the vicinity of the connectors 16*a* and 16*b* and then are connected therewith and the connection points are covered by a cover, so that desired electric connection is completed. Assembly is performed by superimposing the member on the motor unit 2 and further superimposing other members on one another, in such a manner as described above, so that the order of assembly becomes simple.

Figure 3:
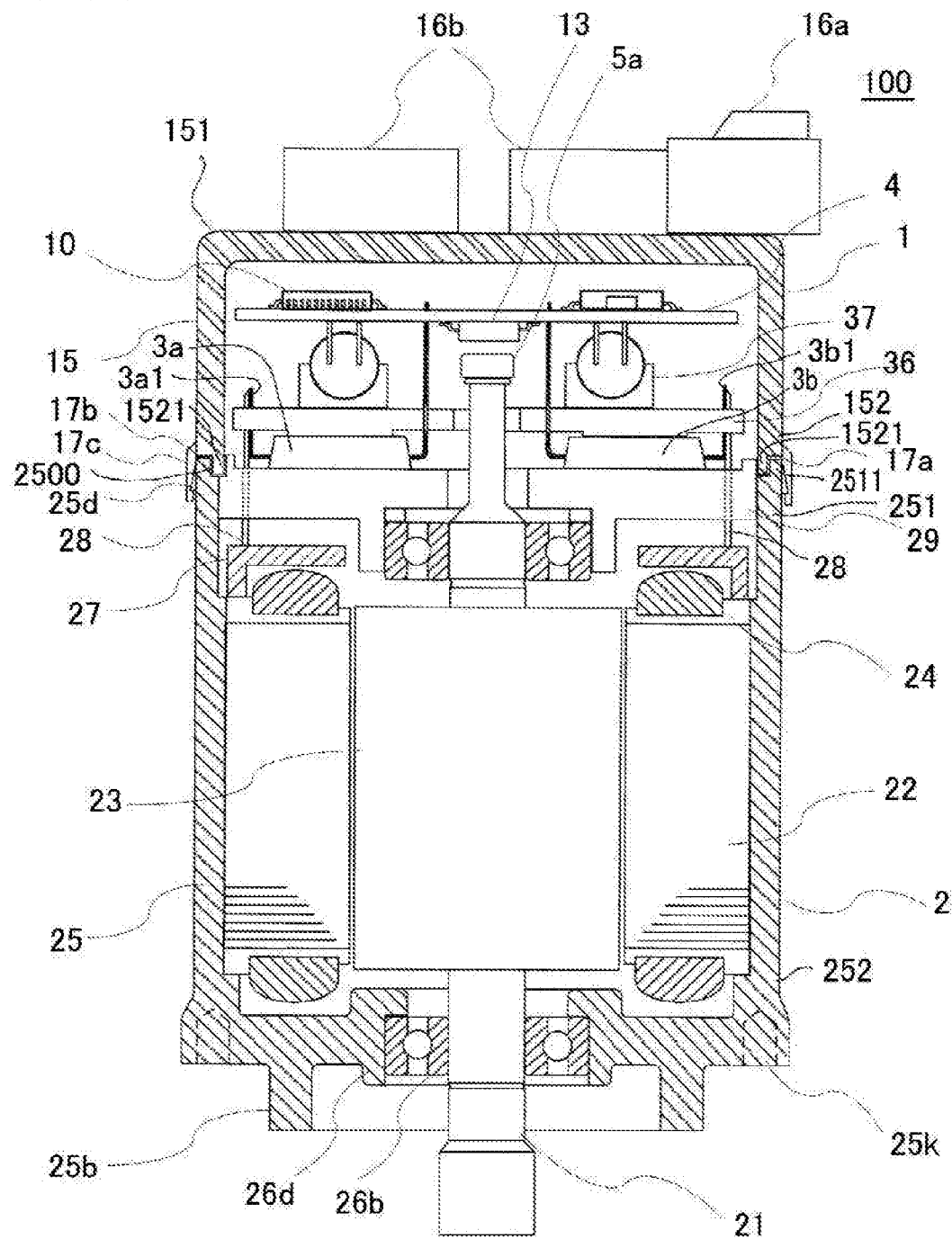
FIG. 3 is a longitudinal cross-sectional view of a variant example of the integrated electric power steering apparatus according to Embodiment 1 of the present invention.

Next, a variant example of the integrated electric power steering apparatus according to Embodiment 1 of the present invention will be explained. FIG. 3 is a longitudinal cross-sectional view of variant examples of the integrated electric power steering apparatus according to Embodiment 1 of the present invention; FIG. 3 illustrates different variant examples in a single and the same drawing. In FIG. 3, in a bonding portion 17*a*, illustrated at the right side of FIG. 3, between the motor case 25 and the unit case 15, a small-thickness portion 1521, which is the inner circumference surface, of the other axle-direction end 152 of the unit case 15, that extends toward the motor case 25, and a small-thickness portion 2511, which is the outer circumferential surface, of the one axle-direction end 251 of the motor case 25, that extends toward the unit case 15, are fitted with and abut on each other. The configuration of the bonding portion 17*a* is a first variant example.

Next, with regard to the bonding portion 17*b*, illustrated at the left side of FIG. 3, between the motor case 25 and the unit case 15, the small-thickness portion 1521, which is the inner circumference surface, of the other axle-direction end 152 of the unit case 15, that extends toward the motor case 25, is the same as that in the first variant; however, a U-shaped groove 2500 is provided in the boundary surface between the motor case 25 and the frame 29, and then the small-thickness portion 1521 of the unit case 15 is inserted into the U-shaped groove 2500. The configuration of the bonding portion 17*b* is a second variant example. The second variant example makes it possible to enlarge the area in which the motor case 25 and the frame 29 abut on each other and to enhance the adhesive properties and the waterproof properties of both the motor case 25 and the frame 29.

Next, in FIG. 3, the unit case 15 formed of a resin has two or more engagement protrusions 17*c*, on the outer circumferential surface of the other axle-direction end 152 thereof, that are spaced a predetermined distance apart from one another and extend toward the motor case 25. Each of the engagement protrusions 17*c* has a recess portion in the inner surface portion thereof. In contrast, the motor case 25 has two or more engagement protrusions 25*d*, on the outer circumferential surface of the one axle-direction end 251 thereof, that are spaced a predetermined distance apart from one another. Each of the engagement protrusions 17*c* of the unit case 15 and the corresponding engagement protrusion 25*d* of the motor case 25 are provided at the respective corresponding positions; when the unit case 15 and the motor case 25 are bonded to each other, the recess portion in the inner surface portion of the engagement protrusion 17*c* and the engagement protrusion 25*d* engage with each other by means of the elasticity of the unit case 15 formed of a resin. The structure of engagement between the engagement protrusions 17*c* and 25*d* is a third variant example. The third variant example makes it possible to fix the unit case 15 more firmly to the motor case 25. Furthermore, because the motor case 25, which is formed of metal, and the unit case 15, which is formed of resin, are bonded to each other, ionization of the metal portion can be suppressed.

Next, the connector 16*a* illustrated in FIG. 2 is disposed in such a way as to extend in the axis direction of the unit case 15, i.e., disposed in a so-called portrait orientation, and an external electric conductor is connected with the connector 16*a* in a direction that is perpendicular to the axis direction of the unit case 15, i.e., in the transverse direction; however, the connector 16*a* illustrated in FIG. 3 is disposed in such a way as to extend in a direction that is perpendicular to the axis direction of the unit case 15, i.e., disposed in a landscape orientation, and an external electric conductor is connected with the connector 16*a* in the axis direction of the unit case 15, i.e., in a longitudinal direction. The configuration of disposing the connector 16*a* in a landscape orientation is a fourth variant example.

In FIG. 3, the flange portion 25*a*, illustrated in FIG. 2, of the motor case 25 is eliminated and female screw holes 25*k* are provided at the radial-direction inner side of the outer circumferential surface of the motor case 25, so that the integrated electric power steering apparatus can be mounted from the speed reducer on a structure of the vehicle by use of male bolts. The mounting structure is a fifth variant example. It goes without saying that it may be allowed that the foregoing variant examples are appropriately combined.

In each of the integrated electric power steering apparatuses according to Embodiment 1 of the present invention, the leg portions 3*a*1 and 3*b*1 of the power modules 3*a* and 3*b* in the control unit 1 are directly connected with the respective winding ends 28 of the motor unit 2 in a metallurgical manner. Metallurgical connection includes TIG welding, resistance welding, laser welding, and the like. Brazing such as soldering may be allowed.

As described above, in the electric power steering apparatus according to Embodiment 1 of the present invention, the flange portion 25*a*, the speed reducer connecting portion 25*b* for a speed reducer, and the first bearing holding portion 26*d* are integrated in the motor case 25, and the frame 29, which is a diaphragm that separates the motor unit 2 from the control unit 1, is inserted into the motor case 25; thus, the electric power steering apparatus can be of a two-part division structure including the control unit 1 and the motor unit 2, and hence there is demonstrated an effect that the number of components is reduced, that the assembly is simplified, and that the number of points to be waterproofed is reduced.

Moreover, the connectors 16*a* and 16*b* are arranged on the anti-motor-unit endface of the unit case 15; thus, the connectors do not protrude in the radial direction and the shape of the electric power steering apparatus becomes cylindrical tubular in accordance with the outline of the motor unit 2, so that the layout at a time when the electric power steering apparatus is mounted is readily implemented. Furthermore, the frame 29 is made to abut on the inside of the motor case 25; thus, it is not required to form, at the outer circumference thereof, an abutting portion where the frame 29 and the motor case 25 abut on each other, and hence the electric power steering apparatus can be divided into the motor unit 2 and the control unit 1.

Because the axle-direction end of the motor case 25, the axle-direction end of the frame 29, and the axle-direction end of the unit case 15 are made to integrally abut on one another, the structure of the electric power steering apparatus can be simplified. Furthermore, because the bonding between the motor case 25 and the frame 29 is bonding between metal members, the motor case 25 and the frame 29 can integrally and firmly be fixed to each other; because the motor case 25, the frame 29, and the unit case 15 are bonded to one another by means of an adhesive, a high rigidity and a high anti-corrosion performance can be obtained.

In the variant example illustrated in FIG. 3, the connector 16a is disposed in a landscape orientation; therefore, although not illustrated, respective external electric conductors can be connected to the connectors 16a and 16b in the axis direction of the unit case 15. It goes without saying that the arrangement of the connectors 16a and 16b can variously be changed depending on the direction of mounting in the vehicle and the arrangement of the harnesses provided in the vehicle. Furthermore, as illustrated in FIG. 3, the flange portion 25a of the motor case 25 is eliminated and female screw holes 25k are provided at the radial-direction inner side of the outer circumferential surface of the motor case 25; thus, the integrated electric power steering apparatus can be mounted from the speed reducer on a structure of the vehicle by use of male bolts.

Embodiment 2

Figure 4:
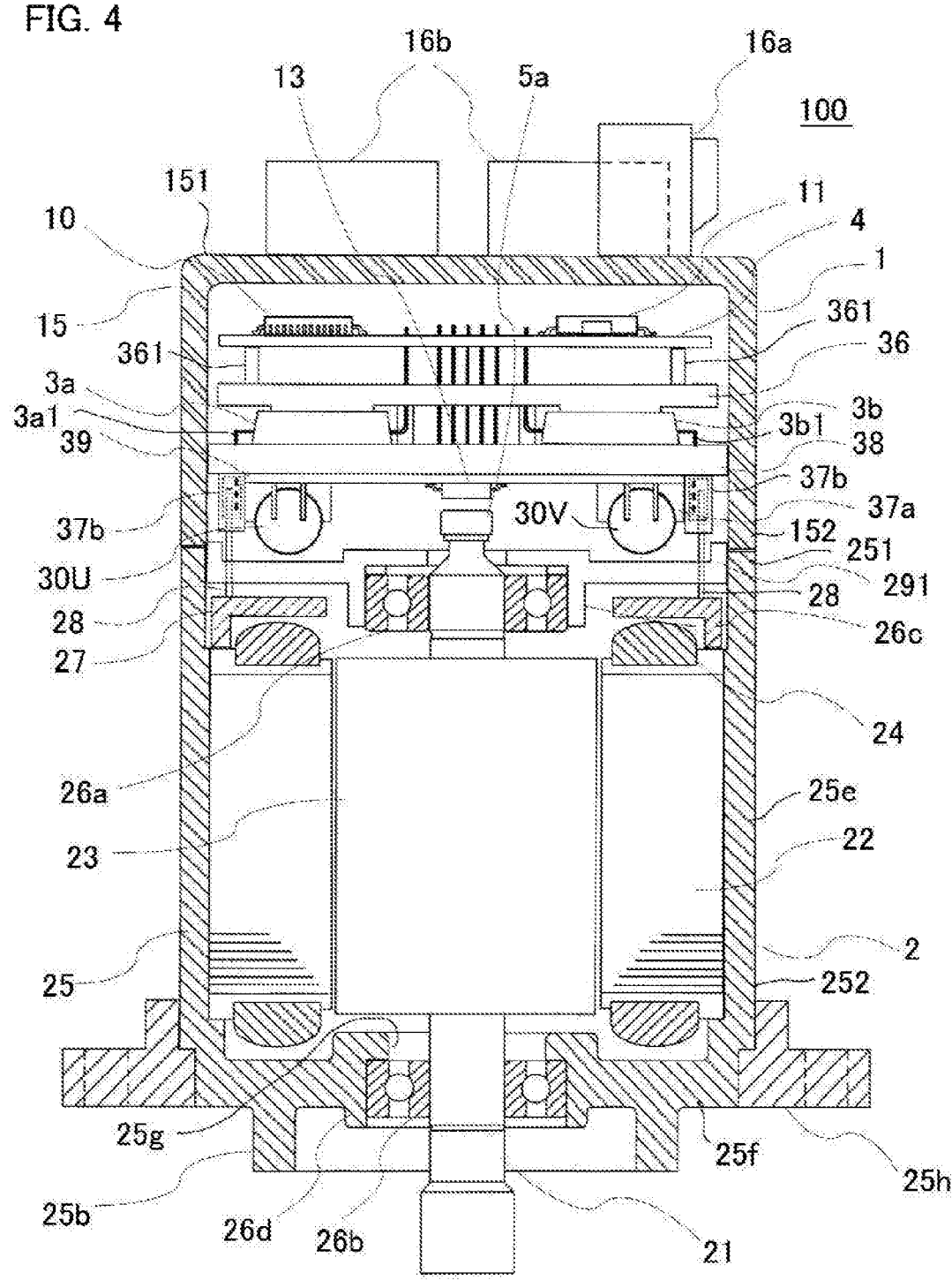
FIG. 4 is a longitudinal cross-sectional view of the integrated electric power steering apparatus according to Embodiment 2 of the present invention.

Next, an integrated electric power steering apparatus according to Embodiment 2 of the present invention will be explained. FIG. 4 is a longitudinal cross-sectional view of the integrated electric power steering apparatus according to Embodiment 2 of the present invention; the constituent elements the same as or equivalent to those in Embodiment 1 are designated by reference characters the same as those in Embodiment 1. In FIG. 4, with regard to the motor unit 2, the respective structures of the stator 22, the rotor 23, the armature winding 24, and the cylinder portion 25e of the motor case 25 are the same as those in Embodiment 1, described above.

In the foregoing embodiment 1 illustrated in FIG. 2, the motor case 25 and the flange portion 25a are formed integrally with each other; however, in Embodiment 2, a mounting unit 25h, which is a member different from the motor case 25, replaces the flange portion 25a and is fitted with and fixed to the outer circumferential surface of the other axle-direction end 252 of the motor case 25. As a result, it is only necessary to change only the mounting unit 25h in accordance with the vehicle type and the like; therefore, there is demonstrated an effect that there can be obtained an integrated electric power steering apparatus that can be mounted in various kinds of vehicles.

The fact that a frame 291 that abuts on and is fixed to the one axle-direction end 251 of the motor case 25 has a function as a diaphragm between the motor unit 2 and the control unit 1 and includes the second bearing holding portion 26c for holding the second bearing 26a is the same as the fact in Embodiment 1, described above; however, the frame 291 does not have such a function as a heat sink that is included in the functions of the frame in Embodiment 1. Accordingly, the frame 291 in Embodiment 2 is formed in such a way as to have a small axle-direction thickness, in comparison with the frame 29 in Embodiment 1.

As is the case with Embodiment 1, the rotor 5a of the rotation sensor 5 is mounted on the axle-direction end, at the control unit side, of the output shaft 21; however, the output shaft 21 is formed in such a way that the anti-output side thereof has a short length, in comparison with the output shaft 21 in Embodiment 1.

In contrast, with regard to the control unit 1, the respective shapes and structures of the connectors 16a and 16b, the intermediate member 36 as a heat sink, and the three power modules (only two power modules 3a and 3b are illustrated in FIG. 4) are approximately the same as those in Embodiment 1. However, in Embodiment 2, in addition to the intermediate member 36 as the first heat sink, a second heat sink 38, which is not provided in Embodiment 1, is provided. The second heat sink 38 has one surface portion and the other surface portion that are in a top side/bottom side relationship, and abuts on and is fixed to the inner circumferential surface of the unit case 15 in such a way that the foregoing surface portions are perpendicular to the direction in which the center axis of the unit case 15 extends.

The one surface portion of the second heat sink 38 adheres to the respective other surface portions of the U-phase power module 3a, the V-phase power module 3b, and the W-phase power module (unillustrated). That is to say, each of the U-phase power module 3a, the V-phase power module 3b, and the W-phase power module is inserted between the second heat sink 38 and the intermediate member 36 that has a function as the first heat sink; thus, the heat radiation performance of each of the U-phase power module 3a, the V-phase power module 3b, and the W-phase power module is enhanced in comparison with the heat radiation performance in Embodiment 1.

A space is provided between the other surface portion of the second heat sink 38 and the one surface portion of the frame 291 of the motor unit 2; in this space, there are arranged the rotor 5a of the rotation sensor 5 mounted on the output shaft 21 and the rotation angle detection circuit 13 that is provided at a position opposite to the position of the rotor 5a. The rotation angle detection circuit 13 is mounted on a second control board 39 that abuts on and is fixed to the other surface portion of the second heat sink 38. Moreover, the noise-suppression capacitors 30U, 30V, and 30W (unillustrated) and capacitor holding members 37a are arranged in the space; the noise-suppression capacitors 30U, 30V, and 30W are mounted on the second control board 39. Furthermore, in the foregoing space, there are arranged the respective connection portions between the respective leg portions of the U-phase power module 3a, the V-phase power module 3b, and the W-phase power module and the respective corresponding winding ends 28 of the motor unit 2.

The output lines of, for example, the power source system (+, −) and the rotation angle detection circuit 13 that are wired on the second control board 39 penetrate the second heat sink 38 and the intermediate member 36 as the first heat sink and extend to the first control board 4. The CPU 10 and the driving circuit 11 are mounted on the one surface portion of the first control board 4. The intermediate member 36 as the first heat sink supports, through a predetermined distance, the first control board 4 through the intermediaries of the columnar members 361.

The respective winding ends 28 of the motor unit 2 penetrate the frame 291 and extend to the respective corresponding leg portions of the U-phase power module 3a, the V-phase power module 3b, and the W-phase power module; however, because of assembly of the components of the control unit 1, it is difficult to directly connect the respective winding ends 28 with the respective corresponding leg portions of the U-phase power module 3a, the V-phase power module 3b, and the W-phase power module. Accordingly, in Embodiment 2, terminal portions 37b formed of metal are provided. Connection terminals of the terminal portion 37b are contained in the unit case 15 formed of an insulating resin. The leg portions 3a1 and 3b1 of the U-phase power module 3a and the V-phase power module 3b and the leg portion of the W-phase power module (the leg portion of the W-phase power module is not illustrated) penetrate the second heat sink 38 and are inserted into the respective corresponding terminal portions 37*b*; the winding ends 28 of the armature windings 24 penetrate the frame 291 and are inserted into the respective corresponding terminal portions 37*b*. Each of the terminal portions 37*b* electrically and mechanically connects the leg portion of the power module with the winding end 28 of the armature winding 24. That is to say, connector connection is performed by the metal terminal portion 37*b*. The foregoing connection may be implemented through so-called press-fit connecting in which the terminal portion 37*b* is formed of a metal piece having a hole and the winding end 28 is inserted into the terminal portion 37*b* so that the leg portions 3*a*1 and 3*b*1 of the power modules are electrically and mechanically connected with the respective corresponding winding ends 28 of the armature windings 24.

As described above, the motor unit 2 and the control unit 1 are integrated with each other in such a way that each of the respective leg portions 3*a*1 and 3*b*1 of the U-phase power module 3*a* and the V-phase power module 3*b* and the leg portion of the W-phase power module and each of the corresponding winding ends 28 of the armature winding 24 are inserted into the terminal portion 37*b*, so that electric assembly of the integrated electric power steering apparatus is completed. The terminal portion 37*b* and the capacitor holding members 37*a* are integrated with each other, so that the self-standing characteristics of these members are obtained and hence the number of components is reduced.

The unit case 15 is formed in such a way that the outer diameter thereof is the same as or approximately the same as that of the motor case 25. Because the components and the like of the motor unit 2 and the components and the like of the control unit 1 are incorporated in the motor case 25 and the unit case 15, respectively, the motor case 25 and the unit case 15 can be bonded to each other by use of a structure the same as that described in Embodiment 1. Therefore, in accordance with the method of incorporating the components and the like in the motor case 25 and the unit case 15, the integrated electric power steering apparatus according to Embodiment 1 or the electric power steering according to Embodiment 2 can be selected.

In the integrated electric power steering apparatus, illustrated in FIG. 4, according to Embodiment 2, the capacitors 30U, 30V, and 30W (30W is not illustrated) are arranged in the space, in the vicinity of the motor unit 2, of the control unit 1, in order to efficiently utilize the space at the abutting portion between the motor unit 2 and the control unit 1; however, it may be allowed that as illustrated in each of FIG. 2 showing Embodiment 1 and FIG. 3 showing the variant example of Embodiment 1, the capacitors 30U, 30V, and 30W are arranged in the space between the intermediate member 36 and the first control board 4. In this case, the terminal portion 37*b* is separated from the capacitor holding members 37*a* and is disposed in the space, in the vicinity of the motor unit 2, of the control unit 1.

Next, the assembly process for the integrated electric power steering apparatus according to Embodiment 2 will be explained. The motor unit 2 is the same as that in Embodiment 1; the frame 291, the second bearing 26*a*, the rotor 23, and the like are incorporated in the motor case 25. In this situation, the rotor 5*a* of the rotation sensor 5 is mounted on the end of the output shaft 21.

In the control unit 1, at first, the rotation angle detection circuit 13, the capacitors 30U, 30V, and 30W, the capacitor holding members 37*a*, and the terminal portion 37*b* are mounted on the second control board 39. Next, the foregoing components and the like are mounted on the second heat sink 38; the U-phase power module 3*a*, the V-phase power module 3*b*, and the W-phase power module are mounted on the anti-motor-unit side thereof in the control unit 1 while attention is payed to the respective directions of the leg portions 3*a*1 and 3*b*1 of the U-phase power module 3*a* and the V-phase power module 3*b* and the leg portion of the W-phase power module; then, the V-phase and U-phase power modules 3*a* and 3*b* and the W-phase power module are inserted between the second heat sink 38 and the intermediate member 36 as the first heat sink. In this situation, the first control board 4 is stacked while attention is payed to the terminals that extend from the related members; then, the first control board 4 and each of the terminals are soldered with each other. Furthermore, while the components and the like of the control unit 1 are covered by the unit case 15, the second heat sink 38 is pressed into the unit case 15 up to a predetermined axle-direction position therein. Next, each of the connectors 16*a* and 16*b* is electrically connected with the control unit 1.

At last, the motor unit 2 and the control unit 1, the assembly processes for which have separately been completed, are combined with each other in such a way that the winding end 28 and the terminal portion 37*b* are integrated with each other. In other words, the motor unit 2 and the control unit 1 are assembled independently from each other and then integrated with each other. As a result, the motor unit 2 and the control unit 1 can be inspected separately from each other and hence a particular inspection process can be applied to each of them; thus, failure after the integration can be reduced.

As described above, in the integrated electric power steering apparatus according to Embodiment 2 of the present invention, with regard to the control unit, all the constituent members of the control unit are inserted into the unit case and the second heat sink covers the control unit; in contrast, with regard to the motor unit, the second bearing holding portion in the vicinity of the control unit is disposed in such a way as to be provided in and sealed by the motor case; then the respective abutting faces of the motor case and the unit case are made to coincide with each other, so that a two-part division structure consisting of the motor unit and the control unit can be formed. As a result, there is demonstrated an advantage that the number of components and the number of assembly steps can be reduced.

Embodiment 3

As described above, in each of the integrated electric power steering apparatuses, illustrated in FIGS. 2 and 3, according to Embodiment 1 of the present invention, each of the respective leg portions 3*a*1 and 3*b*1 of the U-phase power module 3*a* and the V-phase power module 3*b* in the control unit 1 is directly connected with each of the corresponding winding ends 28 of the motor unit 2, in a brazing manner or in a metallurgical manner such as TIG welding, resistance welding, laser welding, or the like. As described above, in the integrated electric power steering apparatus, illustrated in FIG. 4, according to Embodiment 2 of the present invention, the connection may be implemented through connector connection by use of the metal terminal portion 37*b* or through so-called press-fit connecting in which the terminal portion 37*b* is formed of a metal piece having a hole and the winding end 28 is inserted into the terminal portion 37*b* so that each of the leg portions 3*a*1 and 3*b*1 of the power modules is electrically and mechanically connected with each of the respective corresponding winding ends 28 of the armature windings 24. In contrast, in an integrated electric power steering apparatus according to Embodiment 3 of the present invention, the winding ends are mechanically and electrically connected with the respective corresponding leg portions of the power modules by use of different members.

Figure 5:
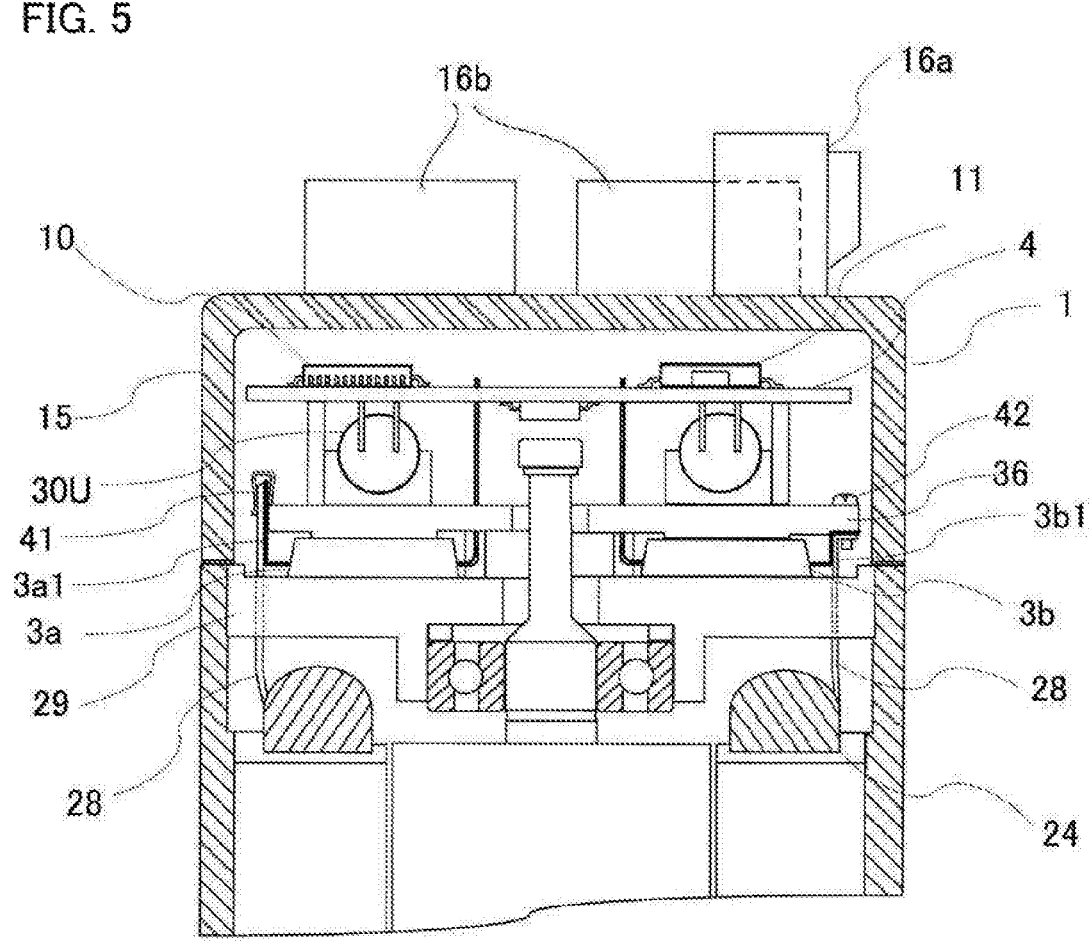
FIG. 5 is a longitudinal cross-sectional view of the principal parts of the integrated electric power steering apparatus according to Embodiment 3 of the present invention.

FIG. 5 is a longitudinal cross-sectional view of the principal parts of the integrated electric power steering apparatus according to Embodiment 3 of the present invention. FIG. 5 concurrently illustrates two different specific examples of connection structures for connecting the winding end with the leg portion of the power module. That is to say, in FIG. 5, the connection structure, at the left side of the drawing, for connecting the winding end 28 with the leg portion 3a1 of the power module 3a is a first specific example; the winding end 28 and the leg portion 3a1 of the U-phase power module 3a are extended upward in the drawing at the periphery of the intermediate member 36, and then the winding end 28 and the leg portion 3a1 of the power module 3a are bound together with a metal clip 41 so as to be electrically and mechanically connected with each other. The clip 41 is fixed to the intermediate member 36. Each of the leg portion 3b1 of the V-phase power module 3b and the leg portion (unillustrated) of the W-phase power module is electrically and mechanically connected with each of the corresponding winding ends 28 in the same manner.

In contrast, the connection structure, at the right side of FIG. 5, for connecting the winding end 28 with the leg portion 3b1 of the V-phase power module 3b is a second specific example; the winding end 28 and the leg portion 3b1 of the power module 3b are bent and superimposed on each other along the surface portion of the intermediate member 36, and then the winding end 28, the leg portion 3b1, and the intermediate member 36 are fastened together with a metal bolt 42. Each of the leg portion 3a1 of the U-phase power module 3a and the leg portion (unillustrated) of the W-phase power module is electrically and mechanically connected with each of the corresponding winding ends 28 in the same manner.

When the intermediate member 36 is formed of a conductive material, respective gaps are provided or respective insulation measures are applied between the winding end 28, each of the respective leg portions 3a1 and 3b1 of the power modules, the clip 41, or the bolt 42 and the intermediate member 36, in order to prevent the winding end 28, each of the respective leg portions 3a1 and 3b1 of the power modules, the clip 41, or the bolt 42 from abutting on the intermediate member 36. When as the armature winding 24, a rectangular wire or a so-called elastic coil having a relatively large thickness is utilized, the ring-shaped connection ring 27 illustrated in each of FIGS. 2, 3, and 4 is not required and hence the winding conductor can directly be extended. It is desirable that in order to enlarge the contact area between the clip 41 or the bolt 42 and the front end of the winding end 28, the front end thereof is widely pressed and deformed.

Next, the manufacturing method for the integrated electric power steering apparatus according to the present invention will be explained. The characteristic of the manufacturing method for the integrated electric power steering apparatus according to the present invention lies in the method of electrically connecting the motor unit 2 with the control unit 1 in the assembly process for the integrated electric power steering apparatus. The method of electrically connecting the motor unit 2 with the control unit 1 in the assembly process for the integrated electric power steering apparatus can be divided into a first method and a second method.

The first method is a method in which in the process of mechanically bonding the motor unit 2 to the control unit 1, electrical connection between the motor unit 2 and the control unit 1 is concurrently implemented. The second method is a method in which before the motor unit 2 is mechanically bonded to the control unit 1, electrical connection between the motor unit 2 and the control unit 1 is completed. The first method is implemented at a time when the integrated electric power steering apparatus has the structure illustrated in FIG. 4 of Embodiment 2. The second method is implemented at a time when the integrated electric power steering apparatus has the structure represented in each of FIGS. 2 and 3 of Embodiment 1 and FIG. 5 of Embodiment 3.

In the foregoing first example (the connection structure at the left side of FIG. 5) illustrated in FIG. 5 of Embodiment 3, as is the case with FIG. 2 of Embodiment 1, the power modules 3a and 3b are mounted on a first surface portion, of the frame 29, that is the top-surface portion thereof in FIG. 5; then, each of the leg portions 3a1 and 3b1 of the power modules and each of the corresponding extended winding ends 28 are clipped with the clip 41 so as to be integrally bonded to each other.

In contrast, in the foregoing second example (the connection structure at the right side of FIG. 5) illustrated in FIG. 5 of Embodiment 3, the winding end 28 is made to pass through a through-hole in the frame 29 and then is bent. Each of the leg portions 3a1 and 3b1 of the power modules is also bent before the power module is mounted on the frame 29; then, at the same time when each of the power modules 3a and 3b is disposed on the frame 29, each of the leg portions 3a1 and 3b1 is superimposed on the bending portion of the winding end 28. Then, after the intermediate member 36 is disposed on each of the leg portions 3a1 and 3b1, each of the leg portions 3a1 and 3b1 and the bending portion of the corresponding winding end 28 are fastened to the intermediate member 36 with the bolt 42. The control unit 1 completed in such a way as described above is not mounted on the motor unit 2 but is disposed in parallel with motor unit 2 in the direction in which the axis line of the output shaft extends, i.e., stacked on the motor unit 2; then, the motor case 25 and the unit case 15 are bonded to each other.

As described above, in the integrated electric power steering apparatus according to each of Embodiments 1 through 3 of the present invention, the electrical connection portion between the motor unit and the control unit is disposed inside the both cases; thus, the respective diameters of the motor unit and the control unit, which are in the shape of a cylinder, can be the same or approximately the same as each other. Because the integrated electric power steering apparatus does not have a structure in which the motor unit and the control unit are electrically connected with each other through an external mounting member, i.e., an external member, it is not required to provide a window for implementing electric connection through the external member in each of the motor case and the unit case; thus, there is demonstrated an effect that the structure thereof is simple and the waterproof property is sufficient. Moreover, because it is not required that in order to bond the motor case to the unit case, a flange or the like for implementing bolting is provided outside the motor case and the unit case, the respective outer diameters of the motor case and the unit case become equal to the maximum outer diameter of the overall integrated electric power steering apparatus; thus, the whole apparatus can be downsized and the shape thereof can be simplified.

In the scope of the present invention, the embodiments thereof can freely be combined with one another and can appropriately be modified or omitted.

The foregoing integrated electric power steering apparatuses according to Embodiments 1 and 3 of the present invention are the ones in which at least any one of the following inventions is put into practice.

(1) An integrated electric power steering apparatus comprising:
　a motor unit; and
　a control unit that controls the motor unit,
　wherein the control unit is disposed at the anti-output side of an output shaft of the motor unit and in parallel with the motor unit in a direction in which the axis line of the output shaft extends, and is integrally fixed to the motor unit,
　　wherein that the motor unit includes a motor case containing a stator and a rotor fixed to the output shaft,
　　wherein the control unit includes a unit case containing constituent members of the control unit,
　　wherein the motor unit and the control unit are fixed to each other in such a way that an axle-direction end, at the unit case side, of the motor case is made to abut on an axle-direction end, at the motor unit side, of the unit case and then the both ends are bonded to each other, and
　　wherein the motor case has a mounting unit that is joined to another structure at the anti-output side of the output shaft.

(2) The integrated electric power steering apparatus according to (1), wherein each of the motor case and the unit case is formed in the shape of a cylinder, and the outer diameters of the respective cylinders are the same as or approximately the same as each other.

(3) The integrated electric power steering apparatus according to (1),
　wherein the unit case includes a connector mounted on the outside of the axle-direction end at the anti-motor-unit side thereof,
　wherein the constituent members of the control unit, contained in the unit case, include at least an inverter circuit that supplies electric power to the motor unit and a control board on which a calculation device that calculates a control amount for controlling the inverter circuit is mounted, and
　　wherein the calculation device calculates the control amount, based on at least control information to be inputted thereto from the outside through the connector.

(4) The integrated electric power steering apparatus according to (3), further including a frame contained in the motor case,
　wherein with regard to the motor case, the axle-direction end thereof at the output side of the output shaft is sealed by a wall portion, and the axle-direction end thereof at the anti-output side of the output shaft is sealed by the frame, and
　wherein each of the wall portion and the frame has a through-hole through which the output shaft passes.

(5) The integrated electric power steering apparatus according to (4),
　wherein the frame has one surface portion and the other surface portion that are in a top side/bottom side relationship, and is disposed inside the motor case in such a way that the one surface portion and the other surface portion are perpendicular to a direction in which the axis line extends,
　wherein some of the constituent members of the control unit abut on the one surface portion of the frame, and
　wherein the frame has a function as a heat sink for radiating heat generated in said some of the constituent members of the control unit.

(6) The integrated electric power steering apparatus according to (5), further including an intermediate member contained in the unit case,
　wherein the intermediate member has one surface portion and the other surface portion that are in a top side/bottom side relationship, and is disposed inside the unit case in such a way that the one surface portion and the other surface portion are perpendicular to a direction in which the axis line extends,
　wherein said some of the constituent members of the control unit abut on the other surface portion of the intermediate member, and the intermediate member has a function as a heat sink for radiating heat generated in said some of the constituent members of the control unit, and
　wherein heat generated in said some of the constituent members of the control unit is radiated through the frame and the intermediate member.

(7) The integrated electric power steering apparatus according to (4), further comprising:
　a heat sink contained in the unit case; and
　an intermediate member contained in the unit case,
　wherein the heat sink has one surface portion and the other surface portion that are in a top side/bottom side relationship, and is disposed inside the unit case in such a way that the one surface portion and the other surface portion are perpendicular to a direction in which the axis line extends,
　wherein the intermediate member has one surface portion and the other surface portion that are in a top side/bottom side relationship, and is disposed inside the unit case in such a way that the one surface portion and the other surface portion are perpendicular to a direction in which the axis line extends,
　wherein some of the constituent members of the control unit abut on the one surface portion of the heat sink and the other surface portion of the intermediate member,
　wherein the intermediate member has a function as a heat sink for radiating heat generated in said some of the constituent members of the control unit, and
　wherein heat generated in said some of the constituent members of the control unit is radiated through the heat sink and the intermediate member.

(8) The integrated electric power steering apparatus according to (1), wherein the bonding is implemented through adhesion with an adhesive.

(9) The integrated electric power steering apparatus according to (1),
　wherein the motor case is formed of metal, and
　wherein the unit case is formed of resin.

(10) The integrated electric power steering apparatus according to (4), wherein the axle-direction end, at the motor unit side, of the unit case abuts on and is bonded to the axle-direction end, at the unit case side, of the motor case and the axle-direction end, at the unit case side, of the frame.

(11) The integrated electric power steering apparatus according to (10),
　wherein the motor case is formed of metal, and
　wherein the frame is formed of metal,
　wherein the unit case is formed of resin,
　wherein the motor case and the frame are fixed to each other through bonding between the metals, and
　wherein the axle-direction end, at the motor unit side, of the unit case abuts on and is bonded with an adhesive to the axle-direction end, at the unit case side, of the motor case and the axle-direction end, at the unit case side, of the frame.

(12) The integrated electric power steering apparatus according to (1), wherein an electrical connection portion where the motor unit and the control unit are electrically connected with each other is disposed in the vicinity of a bonding portion between the motor case and the unit case and inside the motor case and the unit case.

(13) The integrated electric power steering apparatus according to (1), wherein electrical connection between the motor unit and the control unit is performed through at least one of metallurgical bonding, mechanical bonding, and brazing bonding.

(14) A manufacturing method for the integrated electric power steering apparatus according to (1), wherein electrical connection between the motor unit and the control unit is performed before the motor unit and the control unit are bonded to each other.

(15) A manufacturing method for the integrated electric power steering apparatus according to (1), wherein electrical connection between the motor unit and the control unit is performed in a process where the motor unit and the control unit are bonded to each other.

INDUSTRIAL APPLICABILITY

The present invention can be applied to an electric power steering apparatus and eventually to the field of the automobile industry in which an electric power steering apparatus is utilized.

The invention claimed is:

1. An integrated electric power steering apparatus comprising:
    a motor unit; and
    a control unit that controls the motor unit,
    wherein the control unit is disposed at the anti-output side of an output shaft of the motor unit and in parallel with the motor unit in a direction in which an axis line of the output shaft extends, and is integrally fixed to the motor unit,
    wherein the motor unit includes a motor case containing a stator and a rotor fixed to the output shaft,
    wherein the control unit includes a unit case containing constituent members of the control unit, and
    wherein the motor unit and the control unit are fixed to each other in such a way that an axle-direction end, at the unit case side, of the motor case is made to abut on an axle-direction end, at the motor unit side, of the unit case and then the both ends are bonded to each other,
    wherein an axle-direction end of the motor case at the anti-output side of the output shaft is sealed by a frame contained in the motor case,
    wherein the frame has one surface portion and an other surface portion that are in a top side/bottom side relationship, and is disposed inside the motor case in such a way that the one surface portion and the other surface portion are perpendicular to a direction in which the axis line extends,
    wherein some of the constituent members of the control unit abut on the one surface portion of the frame,
    wherein an intermediate member contained in the unit case has one surface portion and an other surface portion that are in a top side/bottom side relationship, and is disposed inside the unit case in such a way that the one surface portion and the other surface portion are perpendicular to a direction in which the axis line extends, and
    wherein some of the constituent members of the control unit abut on the other surface portion of the intermediate member,
    wherein at least one of the constituent members of the control unit abuts on both the one surface portion of the frame and the other surface portion of the intermediate member,
    wherein the frame has a function as a heat sink for radiating heat generated in said some of the constituent members of the control unit,
    wherein the intermediate member has a function as a heat sink for radiating heat generated in said some of the constituent members of the control unit, and
    wherein heat generated in said some of the constituent members of the control unit is radiated through the frame and the intermediate member.

2. The integrated electric power steering apparatus according to claim 1, wherein each of the motor case and the unit case is formed in the shape of a cylinder, and the outer diameters of the respective cylinders are the same as or approximately the same as each other.

3. The integrated electric power steering apparatus according to claim 1,
    wherein the unit case includes a connector mounted on the outside of the axle-direction end at the anti-motor-unit side thereof,
    wherein the constituent members of the control unit, contained in the unit case, include at least an inverter circuit that supplies electric power to the motor unit and a control board on which a calculation device that calculates a control amount for controlling the inverter circuit is mounted, and
    wherein the calculation device calculates the control amount, based on at least control information to be inputted thereto from the outside through the connector.

4. The integrated electric power steering apparatus according to claim 3,
    wherein with regard to the motor case, the axle-direction end thereof at the output side of the output shaft is sealed by a wall portion, and
    wherein each of the wall portion and the frame has a through-hole through which the output shaft passes.

5. The integrated electric power steering apparatus according to claim 4, wherein the axle-direction end, at the motor unit side, of the unit case abuts on and is bonded to the axle-direction end, at the unit case side, of the motor case and the axle-direction end, at the unit case side, of the frame.

6. The integrated electric power steering apparatus according to claim 5, wherein
    the motor case is formed of metal, and
    the frame is formed of metal,
    the unit case is formed of resin,
    the motor case and the frame are fixed to each other through bonding between the metals, and
    the axle-direction end, at the motor unit side, of the unit case abuts on and is bonded with an adhesive to the axle-direction end, at the unit case side, of the motor case and the axle-direction end, at the unit case side, of the frame.

7. The integrated electric power steering apparatus according to claim 1, wherein the bonding is implemented through adhesion with an adhesive.

8. The integrated electric power steering apparatus according to claim 1,
    wherein the motor case is formed of metal, and
    wherein the unit case is formed of resin.

9. The integrated electric power steering apparatus according to claim 1, wherein an electrical connection portion where the motor unit and the control unit are electrically connected with each other is disposed in the vicinity of a bonding portion between the motor case and the unit case and inside the motor case and the unit case.

10. The integrated electric power steering apparatus according to claim 1, wherein electrical connection between the motor unit and the control unit is performed through at least one of metallurgical bonding, mechanical bonding, and brazing bonding.

11. A manufacturing method for the integrated electric power steering apparatus according to claim 1, wherein electrical connection between the motor unit and the control unit is performed before the motor unit and the control unit are bonded to each other.

12. A manufacturing method for the integrated electric power steering apparatus according to claim 1, wherein electrical connection between the motor unit and the control unit is performed in a process where the motor unit and the control unit are bonded to each other.

13. The integrated electric power steering apparatus according to claim 1, wherein winding ends of an armature winding of the stator extend through holes in the frame to connect to said some of the constituent members of the control unit.

14. The integrated electric power steering apparatus according to claim 1, wherein a groove is formed by the abutting of an end portion of the motor case with an end portion of the frame, and
    wherein an end portion of the unit case extends into the groove.

15. An integrated electric power steering apparatus comprising:
    a motor unit; and
    a control unit that controls the motor unit,
    wherein the control unit is disposed at the anti-output side of an output shaft of the motor unit and in parallel with the motor unit in a direction in which an axis line of the output shaft extends, and is integrally fixed to the motor unit,
    a heat sink contained in the unit case; and
    an intermediate member contained in the unit case,
    wherein the heat sink has one surface portion and an other surface portion that are in a top side/bottom side relationship, and is disposed inside the unit case in such a way that the one surface portion and the other surface portion are perpendicular to a direction in which the axis line extends,
    wherein the motor unit includes a motor case containing a stator and a rotor fixed to the output shaft,
    wherein the control unit includes a unit case containing constituent members of the control unit, and
    wherein the motor unit and the control unit are fixed to each other in such a way that an axle-direction end, at the unit case side, of the motor case is made to abut on an axle-direction end, at the motor unit side, of the unit case and then the both ends are bonded to each other,
    wherein an axle-direction end of the motor case at the anti-output side of the output shaft is sealed by a frame contained in the motor case,
    wherein the frame has one surface portion and an other surface portion that are in a top side/bottom side relationship, and is disposed inside the motor case in such a way that the one surface portion and the other surface portion are perpendicular to a direction in which the axis line extends,
    wherein the intermediate member has one surface portion and the other surface portion that are in a top side/bottom side relationship, and is disposed inside the unit case in such a way that the one surface portion and the other surface portion are perpendicular to a direction in which the axis line extends,
    wherein some of the constituent members of the control unit abut on the one surface portion of the heat sink and the other surface portion of the intermediate member,
    wherein the intermediate member has a function as a heat sink for radiating heat generated in said some of the constituent members of the control unit, and
    wherein heat generated in said some of the constituent members of the control unit is radiated through the heat sink and the intermediate member.

* * * * *